United States Patent [19]
Georgopulos et al.

[11] 3,838,213
[45] Sept. 24, 1974

[54] CASE FOR ELECTRICAL COMPONENTS
[75] Inventors: Thomas Georgopulos; Maurice D. McCormick, both of Chicago, Ill.
[73] Assignee: GTE Automatic Electric Laboratories Incorporated, Northlake, Ill.
[22] Filed: Aug. 30, 1973
[21] Appl. No.: 393,266

[52] U.S. Cl................. 178/46, 174/52 R, 174/92, 174/138 F, 336/192, H01f/27/04
[51] Int. Cl......................... H01f 17/08, H01f 15/02
[58] Field of Search ...... 178/45, 46; 317/99, 101 R, 317/101 CM, 117, 118, 120; 336/90, 92, 192; 174/59, 52 R, 65, 50, 92, 138 F; 342/749, 872

[56] References Cited
UNITED STATES PATENTS
970,194  9/1910  Donaldson et al............ 174/65 R X
1,438,938  12/1922  Baldwin, Jr........................... 178/46
2,079,697  5/1937  Ranges................................. 178/46
3,302,916  2/1967  Kriadis et al....................... 317/99 X
3,349,405  10/1967  Wright................................ 343/872
3,445,849  5/1969  Sanford.............................. 343/749
3,701,835  10/1972  Eisele et al. ....................... 174/59 X Primary Examiner—James W. Lawrence
Assistant Examiner—Marvin Nussbaum
Attorney, Agent, or Firm—David W. Heid

[57] ABSTRACT

An insulating case for electrical components is disclosed, the case being principally composed of a pair of complementary sections which are hinged along one edge. Each of the sections includes a rib for holding a plurality of terminal means and the sections are provided with latch and catch means for releasably latching the sections in a closed position.

9 Claims, 8 Drawing Figures

CASE FOR ELECTRICAL COMPONENTS

BACKGROUND OF THE INVENTION

This invention relates generally to cases for holding electrical components and more particularly to cases which are adapted to hold a plurality of loading coils for use with telephone circuits.

In the telecommunication field it is necessary to include loading coils in telephone cables to add inductance to the lines to neutralize the capacitance which is built up when the cable pairs lie side by side over a long distance. These loading coils are spliced in series with conductors of the cable to improve the electrical characteristics of the cable.

It is quite common for a large number of loading coils to be included within a closure which is hermetically sealed and utilizes lead outs from the coils to a cable stub exterior to the case. The individual leads from the cable stub are then spliced to the telephone line as required. U.S. Pat. No. 834,352 issued to H. F. Albright on Oct. 30, 1906 illustrates an enclosure which holds a plurality of individual loading coils, the coils being stacked individually upon a center rod within the case. Somewhat similar stacking arrangements are also illustrated in U.S. Pat. No. 2,079,697, issued May 15, 1937 to J. E. Ranges and also in U.S. Pat. No. 2,047,731 issued July 14, 1936 To R. M. C. Greenidge. The Greenidge and Ranges patents, in a manner similar to Albright, illustrates stacking individual coils upon a center rod, the coils being ultimately hermetically sealed in an enclosure. All of these embodiments require the assembly of individual coils on a stacking rod and involve tedious hand assembly.

SUMMARY OF THE INVENTION

In the present invention, an insulating case is disclosed which may be used to encase a plurality of the loading coils, or other electrical components, and the case provides means for releasably opening and closing it to allow easy access to the components interior thereof. When the case is used to hold loading coils which are of the toroidal shape, an insulating member is included in the center of the case so that after completion of the assembly of the case, the coils and the insulating member, the assembly of coils may then be stacked on a metal rod and ultimately a number of cases included in a larger enclosure. The terminals inserted into the case for use in constructing a loading coil assembly allow the individual wires from the loading coils to be soldered to one end of the terminal and the other end of the corresponding terminal is provided with a rectangular cross-section so that conductors from the cable may be connected thereto by wrapping them around this reactangular shaped terminal end. The wrapped wire method of assembly reduces the labor and time in assemblying the overall unit.

DESCRIPTION OF THE PREFERRED EMBODIMENT

Figure 1:
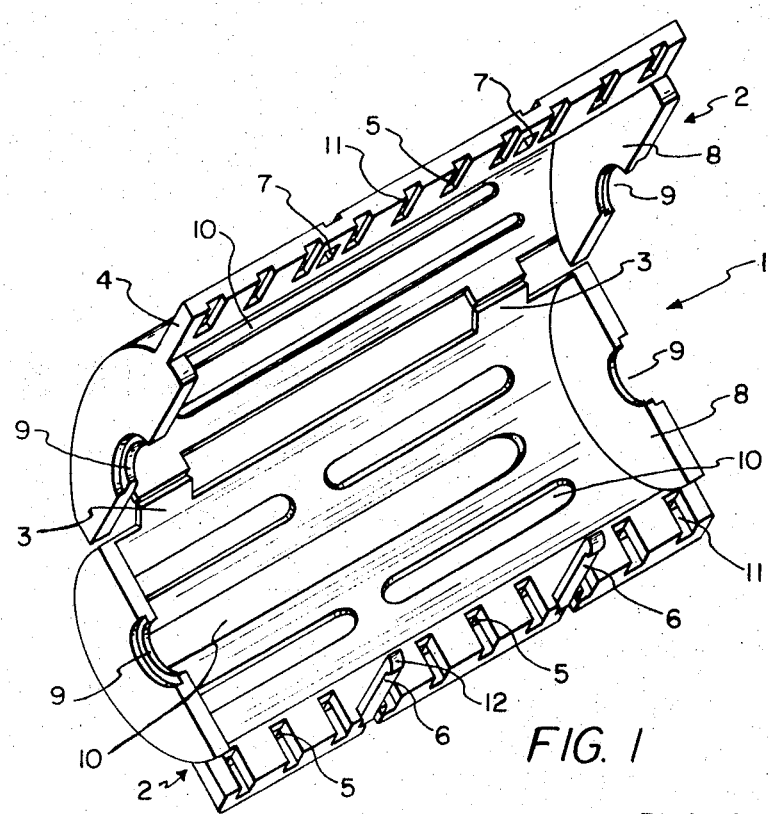
FIG. 1 is a perspective view of the case in the present invention with the complementary half sections shown in a partially opened position.

Referring to FIG. 1, case 1 of the present invention is illustrated in perspective view, with complementary half sections 2 shown in a partially open position. Half sections 2 are joined at 3 with hinges which are integral with the half sections, the total case being of unitary construction. Case 1 is preferably of a molded construction from a pliable plastic material such as polypropylene. Half sections 2 include at the free ends thereof ridges 4 for holding a plurality of terminals which may be inserted through apertures 5, the terminal serving to allow connection from external cabling to the electrical components which would be housed in the case 1. Complementary half sections 2 and hinge 3 allow the case to be opened and closed so that electrical components may be inserted in the case and by virtue of a pair of catch members 6, which extend from ridges 4 on one of the half sections, and latch openings 7, which are included in ridges 4 of the other half section, the case may be maintained in a closed position. Upon closing case 1, catch member 6 will snap into latch opening 7 and hold half sections 2 closed. To open case 1, catch member 6 may be pressed downward to release it from latch opening 7 and the case can then be opened.

Figure 6:
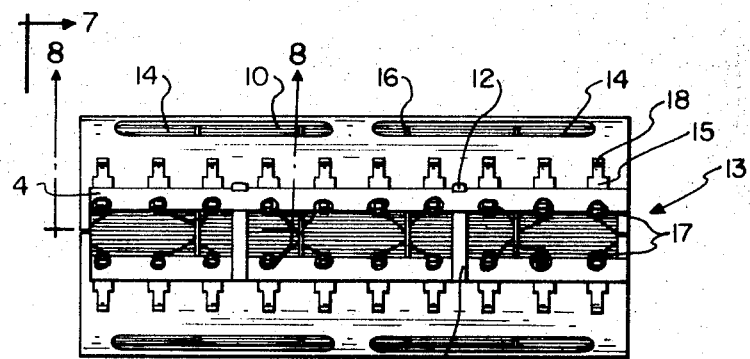
FIG. 6 is a top plane view of a loading coil assembly using the case in which a plurality of loading coils have been inserted and the plurality of terminals used to bring out the leads from these loading coils.

Half sections 2 also include end walls 8 with semicircular openings 9 included therein. Semicircular openings 9 are included in this particular embodiment since the case with these openings will ultimately be used to house a plurality of loading coils as illustrated in FIG. 6. It will also be noted that the half sections 2 include a number of oblong openings 10 which are useful in the situation in which the case and its contents will be included in a larger enclosure into which a liquid insulating material may be ultimately forced. These oblong openings allow the insulating material to freely enter the case 1 and surround the components contained therein.

Figure 2:
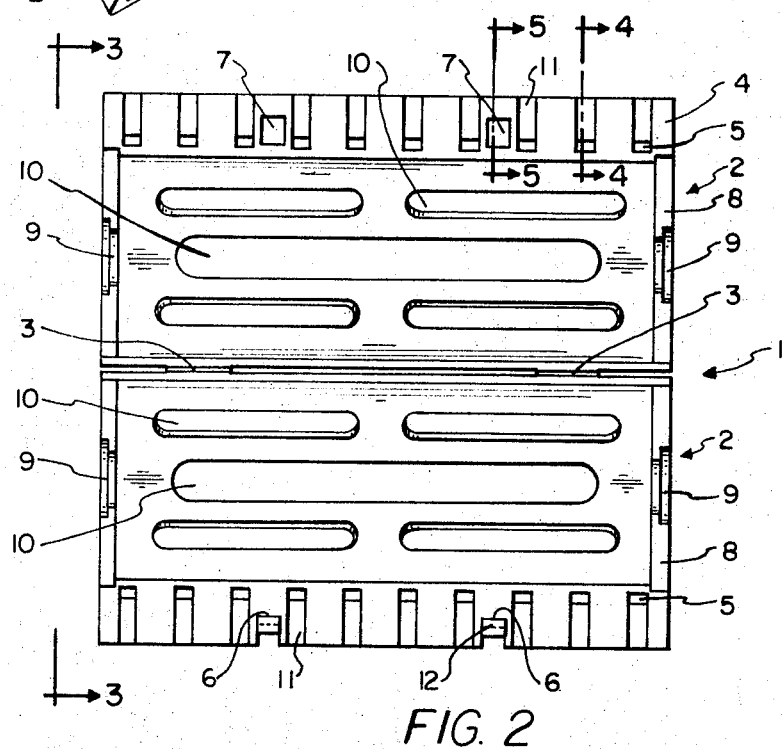
FIG. 2 is a top plan view of the case in the present invention in which the half sections have been opened completely.

Now referring to FIG. 2, case 1 is shown with the half sections 2 in the completely open position. In FIG. 2 it can better be appreciated that in conjunction with each of the apertures 5 for receiving terminals which will be described later, along the interior edge of the ridges 4 each of the apertures 5 includes a channel 11 into which one portion of the terminal will be folded and set therein. It will also be noted that the catch members 6 are indented somewhat into ridge 4 and extend upward from the ridge. Also from the view in FIG. 2 it will be observed that the semicircular openings 9 are of a double diameter, the larger diameter being to the outside edge of walls 8. The significance of the double diameter will be explained subsequently when the total assembly is described.

Figure 3:
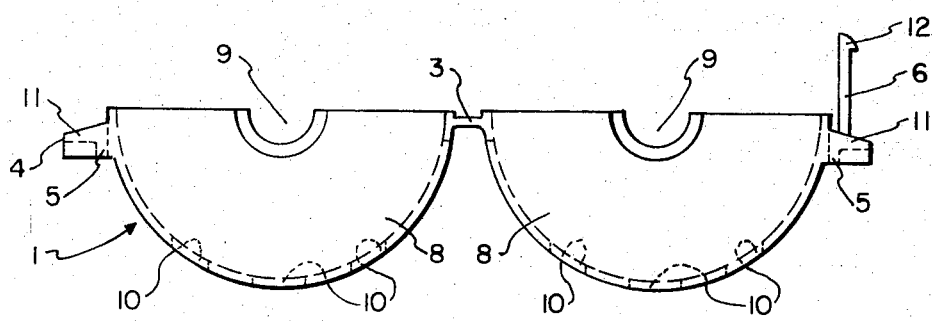
FIG. 3 is a view taken along the lines 3—3 of FIG. 2.

FIG. 3 is an end view taken along the lines of 3-3 of FIG. 2 and illustrates more clearly the configuration of hinges 3, the configurations of apertures 5 and channels 11. Also in FIG. 3 the hook-shaped end 12 of catch member 6 is also clearly illustrated.

Figure 4:
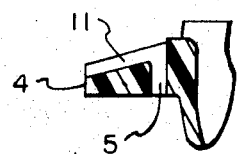
FIG. 4 is a partial sectional view taken along the lines 4—4 of FIG. 2.

In FIG. 4 a cross-sectional view of the aperture 5 and channel 11 for receiving the terminal are illustrated. Subsequent views will illustrate the terminals in position in each of the apertures 5 in a complete assembly.

Figure 5:
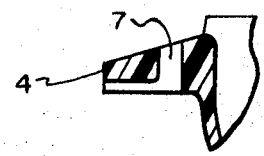
FIG. 5 is a partial sectional view taken along the lines 5—5 of FIG. 2.

A view of latch opening 7 as illustrated in FIG. 5 where a cross-sectional view of latch opening 7 is shown. It will be noted that latch opening 7 is generally L-shaped with the upper cutout allowing the hook member 12 to snap up toward the free end of ridge 4 to releasably close the two half sections of the case.

Your attention is directed to FIG. 6 which is a top plan view of loading coil assembly 13. Loading coil assembly 13 includes first, the flexible case 1 of the type illustrated in FIG. 1, a plurality of loading coils 14 which are of toroidal shape and a plurality of generally U-shaped terminals 15 which have been inserted into apertures 5 of ridge 4 on each of the half sections 2. With loading coils 14 standing in side-by-side relationship it is desirable to include insulators between the adjacent pairs to prevent a possible shorting of the wires of one coil to the wires of another. To facilitate the insulation, flat disc shaped insulators 16 have been included between the adjacent pairs of loading coils 14. In FIG. 6 it will be noted that ridges 4 on the free ends of half sections 2 are not at the very end of the half section but are inset somewhat. From the view of the assembly in FIG. 6 it will be appreciated that by locating ridges 4 inward from the very edge of the half section 2 an open space between the ridges 4 and the associated terminals 15 allow easy access for bringing the leads from loading coils 14 out to be terminated at one end of the terminals 15. FIG. 6 also clearly illustrates how the hook-shaped ends 12 of catch member 6 have been inserted through latch opening 7 and snap upward into the opening 7 to hold the case 1 in a closed position.

The interior leg 17 of U-shaped terminal 15 receives the ends of the wires of coils 14 and in this particular embodiment may be soldered thereto. Outer leg 18 of U-shaped terminal 15 is set apart spaced away from the inner leg 17 is provided with square corners to facilitate a wrapping of wire thereabout.

Figure 7:
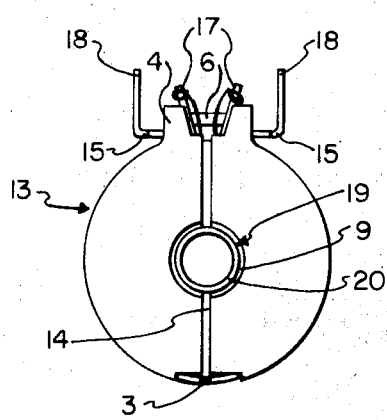
FIG. 7 is a view taken along the lines 7—7 of FIG. 6.

Referring to FIG. 7, which is a view taken along the lines 7—7 of FIG. 6, it will be noted that the outer legs 18 of terminals 15 are somewhat higher than the inner legs 17, this greater height being added to facilitate easy connection of wires to the outer leg 18 without interference to the interior legs 17. In those applications in which the loading coil assembly 13 will be stacked on metallic rods, it is desirable to include a tubular insulator 19 which is adapted to fit through the center of toroidal shaped loading coils 14. Tubular insulator 19 includes flanges 20 on each end which cooperate with the semicircular openings 9 in each of the half sections 2, flanges 20 fitting into the larger diameter of the semicircular opening 9 and hence when the half sections 2 are closed the tubular insulator is retained in place within the assembly 13.

Figure 8:
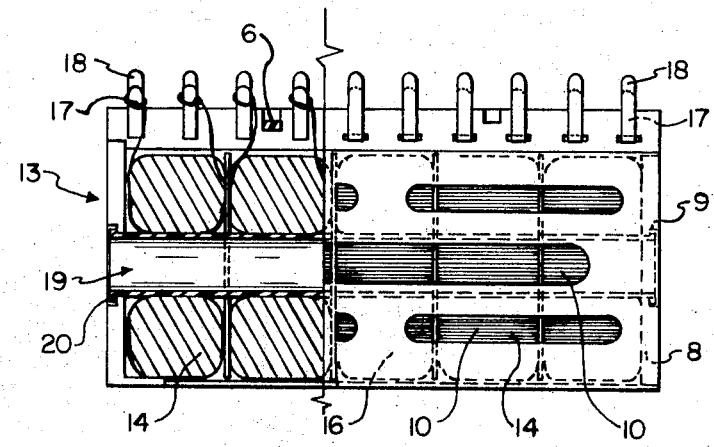
FIG. 8 is a side view of the loading coil assembly of FIG. 6 with a portion of the assembly shown sectioned.

Turning to FIG. 8 which is a view taken along the lines 8—8 of FIG. 6 in which part of the loading coil assembly 13 has been broken away to show the interior components, flange 20 on tubular insulator 19 is better illustrated, showing how it fits into the larger diameter portions of semicircular opening 9. The opposite end of tubular insulator 19 includes the identical flange 20 for cooperating with its associated semicircular openings 9.

We claim:

1. A case for holding a plurality of electrical components, comprising:
    first and second generally semi-circular portions joined along one edge by an integral hinge to allow opening and closing of said portions:
    releasable latching means for holding said first and second portions in a closed position; and
    terminal receiving means integral with and extending from at least one of the free edges of one of said semicircular portions.

2. The case as claimed in claim 1 wherein the free edges are spaced apart when said semi-circular portions are in the closed position to allow passage of electrical leads from the interior to the exterior of the case.

3. The case as claimed in claim 1 wherein the ends of said semi-circular portions include wall sections.

4. The case as claimed in claim 3 wherein said wall sections include means for holding a tubular member along the longitudinal axis of said case when said case is in the closed position.

5. The case as claimed in claim 1 wherein said semi-circular portions include a plurality of elongated openings.

6. A loading coil assembly for a plurality of loading coils, comprising:
    a cylindrical insulating case including end walls and terminal holding means integral with said case;
    a plurality of terminals inserted in said terminal holding means;
    a plurality of loading coils stacked in said case in a side-by-side relationship with leads connectible to said terminals; and
    a tubular insulator supported by said end walls such that said insulator is positioned along the longitudinal axis of said case and extends through the center of said coils.

7. The assembly as claimed in claim 6 wherein said tubular insulator is hollow to allow stacking of assemblies about a center rod.

8. A loading coil assembly for a plurality of loading coils, comprising:
    a cylindrical insulating case including terminal holding means integral therewith;
    a plurality of substantially U-shaped terminals inserted in said terminal holding means with the bight portion of said U supported by said terminal holding means whereby the free ends of the terminals face outward from said case; and
    a plurality of loading coils stacked in said case in a side-by-side relationship with leads connectible to said terminals.

9. The assembly as claimed in claim 8 including insulating means interposed between adjacent loading coils.

* * * * *